(12) United States Patent
Sjöstrand et al.

(10) Patent No.: US 11,144,755 B2
(45) Date of Patent: Oct. 12, 2021

(54) SUPPORT GLINT FOR REMOTE EYE TRACKING

(71) Applicant: Tobii AB, Danderyd (SE)

(72) Inventors: Jonas Sjöstrand, Danderyd (SE); Anders Dahl, Danderyd (SE); Mattias I Karlsson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 16/367,825

(22) Filed: Mar. 28, 2019

(65) Prior Publication Data

US 2019/0303646 A1 Oct. 3, 2019

Related U.S. Application Data

(60) Provisional application No. 62/649,390, filed on Mar. 28, 2018.

(51) Int. Cl.
*G06K 9/00* (2006.01)
*G06T 7/73* (2017.01)
*G06F 3/01* (2006.01)

(52) U.S. Cl.
CPC .......... *G06K 9/0061* (2013.01); *G06F 3/013* (2013.01); *G06T 7/73* (2017.01); *G06T 2207/10152* (2013.01)

(58) Field of Classification Search
CPC .......................... G06K 7/10732; H04N 5/374
USPC ......... 398/118, 129; 348/207.11, 211.3, 362; 382/274
See application file for complete search history.

(56) References Cited

U.S. PATENT DOCUMENTS

| | | | |
|---|---|---|---|
| 2011/0242334 A1* | 10/2011 | Wilburn .................. | H04N 5/272 348/207.1 |
| 2015/0077543 A1* | 3/2015 | Kerr ...................... | H04N 5/2256 348/135 |
| 2018/0109771 A1* | 4/2018 | Rivard ...................... | H04N 9/09 |
| 2019/0019023 A1* | 1/2019 | Konttori ............ | G02B 27/0172 |

\* cited by examiner

*Primary Examiner* — Kiet M Doan
(74) *Attorney, Agent, or Firm* — Samuel I. Yamron

(57) ABSTRACT

Methods and corresponding systems of controlling illuminators in an eye tracking system are disclosed. The system includes a first image sensor, a second image sensor, a first close illuminator arranged to capture bright pupil images by the first image sensor, a second close illuminator arranged to capture bright pupil images by the second image sensor and one or more far illuminators arranged to capture dark pupil images by the first image sensor and the second image sensor. In the methods main and support illuminators are controlled during exposure of a first and a second image sensor to produce enhanced contrast and glint position for eye/gaze tracking.

13 Claims, 6 Drawing Sheets

SUPPORT GLINT FOR REMOTE EYE TRACKING

CROSS-REFERENCE TO RELATED APPLICATION

The present application claims benefit to U.S. provisional patent application Ser. No. 62/649,390, filed on Mar. 28, 2018, to Sjöstrand et al., entitled "SUPPORT GLINT FOR REMOTE EYE TRACKING", and is hereby incorporated by reference in its entirety.

TECHNICAL FIELD

The present disclosure generally relates to the field of eye tracking. In particular, the present disclosure relates to systems and methods for controlling illuminators in an eye tracking system.

BACKGROUND

In eye tracking applications, digital images of the eyes of a user are captured by one or more cameras/image sensors and the digital images are analyzed in order to estimate an eye position and a gaze vector of the user. There are different methods for achieving such an estimation. In some methods ambient light is used when retrieving images of the eyes of the user and in some methods additional light sources (illuminators) are used to illuminate the eyes for retrieving images of the eyes of the user. Generally, the estimation of the eye position and the gaze vector is based on identification of the pupils of the eyes of the user, together with identification of glints (corneal reflections) in the eyes of the user. In order to identify a pupil of an eye in an image of the eye, the contrast between a representation of the pupil and a representation of an iris of the eye in the image must be sufficient.

One known method of eye tracking includes the use of infrared light and an image sensor. The infrared light is directed towards the eye of a user and the reflection of the light is captured by an image sensor to produce an image of the eye. Through analysis of the captured image, the position of the eye in space and the point of gaze is estimated. One such system is described in U.S. Pat. No. 7,572,008 (which is hereby incorporated by reference in its entirety).

When estimating an eye position and a gaze vector based on identification of the pupils of the eyes of the user, together with identification of glints (corneal reflections) in the eyes of the user, the contrast between a representation of the pupil and a representation of an iris of the eye in the image must be sufficient and the glints should be identified and preferably be positioned on a part of the cornea which may be approximated as spherical.

There are two different options of producing contrast between the representation of the pupil and the representation of the iris in an image of the eye. Either an illuminator (called close illuminator in the following) is used arranged coaxially with (or close to) the light sensor, or an illuminator (called far illuminator in the following) is used which is arranged non-coaxially with (or further away from) the light sensor. For the close illuminator, the light sensor may capture bright pupil (BP) images of the user's eyes. Due to the coaxial arrangement of the close illuminator and the light sensor, light reflected from the retina of an eye returns back out through the pupil towards the light sensor, so that the representation of the pupil appears brighter than the representation of the iris surrounding it in images captured with only the close illuminator illuminating the eye. For the far illuminator, the light sensor may capture dark pupil (DP) images. Due to the non-coaxial arrangement of the far illuminator and the light sensor, light reflected from the retina of an eye does not reach the light sensor and the representation of the pupil appears darker than the representation of the iris surrounding it in images captured with only the far illuminator illuminating the eye.

Whether a system for eye/gaze tracking captures BP or DP images depends on the user/subject. Some users have a high (good) BP response which causes the representation of the pupil to become sufficiently bright in relation to the representation of the iris surrounding it in the image. For such users, the BP images will generally provide the best contrast between the representation of the pupil and the representation of the iris in the image for determining the position the representation of the pupil in the image. Some users have a low (bad) BP response which causes the representation of the pupil not to be sufficiently bright in relation to the representation of the iris surrounding it in the image. For such users, the DP images will generally provide the best contrast between the representation of the pupil and the representation of the iris in the image for determining the position the representation of the pupil in the image.

Accuracy and precision are used as indicators of the eye tracker data validity. A system with good accuracy and precision will provide more valid data as it is able to truthfully describe the location of a person's gaze on a screen. Accuracy is defined as the average difference between the real stimuli position and the measured gaze position. Precision is defined as the ability of the eye tracker to reliably reproduce the same gaze point measurement, i.e. it measures the variation of the recorded data via the Root Mean Square (RMS) of successive samples.

To enhance the precision and accuracy of eye tracking a system can be provided with two cameras/image sensors. Each of the image sensors captures an image of an eye and the two images thus captured are used to enhance the precision and accuracy of eye/gaze tracking. By using two cameras, better precision and accuracy can be achieved even for identification of only one glint. For system using one camera, generally identification of two glints are required.

To encompass both the BP and DP images, the system is provided with a close illuminator for each of the image sensors and one or more far illuminators for the image sensors.

For the BP case, an image is first captured by one of the image sensors when the eye is illuminated by its associated close illuminator. Then an image is captured by the other one of the image sensors when the eye is illuminated by its associated close illuminator.

For the DP case, images are captured by the two image sensors simultaneously when the eye is illuminated by one of the one or more far image sensors.

In addition to causing the BP and DP effect in the image used in order to estimate the position of the representation of the pupil in the image, the illuminator or illuminators used for capturing the images by means of the two image sensors also give rise to a respective glint used for determining gaze direction.

Depending on the position of each of the image sensors, each of the close illuminators, and each of the one or more far illuminators, the possibility to identify the glint in each of the two images will vary. In one example system the two image sensors and associated near illuminators are arranged centrally in horizontal direction, and two far illuminators arranged one at one side and the other on the other side horizontally of the image sensors. Then, if a user, for which BP images are captured, is looking at a point far to one side of the center horizontally in relation to the two image sensors, glints produced by the close illuminators may not be located on the best portion of the cornea for eye/gaze tracking. Similarly, if a user for which DP images are captured is looking at a point close to the center horizontally in relation to the two image sensors, glints produced by the far illuminators may not be positioned on the best portion of the cornea for gaze tracking.

Hence, there are situations when identification of glints can become difficult or impossible, or identified glints may not be suitable to use for estimating the gaze direction of the user, since the glints may not be positioned on the best portion of the cornea for gaze tracking.

It would be desirable to provide further systems and methods addressing one or more of the issues with known systems and methods.

SUMMARY

Methods and systems are disclosed for use in controlling illuminators in an eye tracking system.

The eye tracking system includes a first image sensor/camera, a second image sensor/camera, a first close illuminator arranged to capture bright pupil (BP) images by the first image sensor, a second close illuminator arranged to capture bright pupil (BP) images by the second image sensor and one or more far illuminators arranged to capture dark pupil images by the first image sensor and the second image sensor.

In example systems the first close illuminator is arranged coaxially with or near the first image sensor, the second close illuminator is arranged coaxially with or near the second image sensor and the one or more far illuminators are arranged non-coaxially with or far from the first image sensor and the second image sensor.

According to example methods, two illuminators of the first close illuminator, second close illuminator, and one or more far illuminators, are used for each exposure of each of the first image sensor and second image sensor. One of the illuminators used for a camera exposure is used as a main illuminator and the other is used as a support illuminator. The main illuminator is selected to optimize or enhance pupil contrast and the support illuminator is selected to optimize or enhance glint position on the cornea, i.e. a glint position close to the center of the cornea.

In a method for DP images, one of the one or more far illuminators (main illuminator for the first image sensor) is maintained activated during an exposure time of the first image sensor, and the same one of the one or more far illuminators (main illuminator also for the second image sensor) is also maintained activated during an exposure time of the second image sensor. Furthermore, the second close illuminator (support illuminator for the first image sensor) is maintained activated during a portion of the exposure time of the first image sensor and the first close illuminator is maintained deactivated during the exposure time of the first image sensor. Similarly, the first close illuminator (support illuminator for the second image sensor) is maintained activated during a portion of the exposure time of the second image sensor, and the second close illuminator is maintained deactivated during the exposure time of the second image sensor.

Selection of which of the one or more far illuminators should be used as a main illuminator for the first image sensor and the second image sensor for a time frame (i.e. a period of time in which an image is captured for the first image sensor and the second image sensor, respectively) may be done based on eye tracking data from a previous frame. For example, if the eye tracking data from a previous frame indicates that the user is looking to the left, an illuminator of the one or more far illuminators being located to the left is selected as a main illuminator.

In a method for BP images, the first close illuminator is maintained activated (main illuminator for the first image sensor) during an exposure time of the first image sensor, and the second close illuminator is maintained deactivated during the exposure time of the first image sensor. The second close illuminator (main illuminator for the second image sensor) is maintained activated during an exposure time of the second image sensor and the first close illuminator is maintained deactivated during the exposure time of the second image sensor. Furthermore, one of the one or more far illuminators (support illuminator for the first image sensor) is maintained activated during a portion of the exposure time of the first image sensor, and the same one of the one or more far illuminators (support illuminator also for the second image sensor) is maintained activated during a portion of the exposure time of the second image sensor. It is to be noted that the support illuminator for the second image sensor may in other example methods be a different one of the one or more far illuminators than the support illuminator for the first image sensor.

Selection of which of the one or more far illuminators should be used as a support illuminator for the first image sensor and the second image sensor for a time frame (i.e. a period of time in which an image is captured for the first image sensor and the second image sensor, respectively) may be done based on eye tracking data from a previous frame. For example, if the eye tracking data from a previous frame indicates that the user is looking to the left, an illuminator of the one or more far illuminators being located to the left is selected as a main illuminator.

One aim is to minimize the total exposure time of the first image sensor and the second image sensor for each exposure cycle, i.e. to minimize the time from the start of the exposure time of the image sensor of the first image sensor and the second image sensor for which the exposure time starts first to the end of the exposure time of the image sensor of the first image sensor and the second image sensor for which the exposure time ends last.

For DP images, a main illuminator for the first image sensor is one of the one or more far illuminators arranged to capture DP images by the first image sensor, e.g. arranged non-coaxially with or far from the first image sensor. A main illuminator for the second image sensor is said one of the one or more far illuminators arranged to capture DP images by the second image sensor, e.g. arranged non-coaxially with or far from the second image sensor.

Since the main illuminator for the first image sensor during exposure and the main illuminator for the second image sensor during exposure is the same one of the one or more far illuminators, illumination of the first image sensor and the second image sensor during exposure by means of said one of the one or more far illuminators can be concurrent.

For DP images, a support illuminator for the first image sensor is the second close illuminator arranged to capture BP images by the second image sensor, e.g. arranged coaxially with or near the second image sensor. A support illuminator for the second image sensor is the first close illuminator arranged to capture BP images by the first image sensor, e.g. arranged coaxially with or near the first image sensor.

Illumination of the first image sensor during exposure by means of the first close illuminator will result in a BP effect and may thus result in reduced contrast between a representation of a pupil and an iris, respectively, in the resulting image. Similarly, illumination of the second image sensor during exposure by means of the second close illuminator will result in a BP effect and thus may result in reduced contrast between a representation of a pupil and an iris, respectively, in the resulting image. Hence, the illumination of the first image sensor during exposure by means of the second close illuminator, used as a support illuminator for the first sensor, has to be separated in time from exposure of the second image sensor. Similarly, the illumination of the second image sensor during exposure by means of the first close illuminator, used as a support illuminator for the second sensor, has to be separated in time from exposure of the first image sensor.

One way of limiting the time from the start of the exposure of the image sensor of the first image sensor and the second image sensor for which exposure starts first to the end of the exposure of the image sensor of the first image sensor and the second image sensor for which exposure ends last for DP images, is to illuminate the first image sensor during a first time period which is $t_{main}$ long by means of said one of the one or more far illuminators and to illuminate the first image sensor also by means of the second close illuminator during a second time period which is $t_{support}$ long at the beginning of the first time period, where $t_{support}$ is shorter than $t_{main}$, and then after the end of the second time period illuminate the second image sensor during a third time period which is $t_{main}$ long by means of said one of the one of more far illuminators and to illuminate the second image sensor also by means of the first close illuminator during a fourth time period which is $t_{support}$ long at the end of the third time period. By doing so, said one of the one or more far illuminators can be continuously lit during the first time period and the third time period, which are partly overlapping. Furthermore, the second close illuminator can be lit only during the second time period which is the first $t_{support}$ long part of the first time period and which does not overlap the third time period during the exposure of the second image sensor. Hence, the illumination by means of the second close illuminator during the second time period will not affect the DP image of the second image sensor. Similarly, the first close illuminator can be lit only during the fourth time period which is the last $t_{support}$ long part of the third time period and which does not overlap the first time period during the exposure of the first image sensor. Hence, the illumination by means of the first close illuminator during the fourth time period will not affect the DP image of the first image sensor.

The length $t_{support}$ of the second and fourth time period during which the second close illuminator and the first close illuminator, respectively, is lit should be long enough to produce a glint which can be identified in the image but at the same time be short enough not to reduce the contrast between a representation of a pupil and an iris in the image. In alternative or in combination with adapting the length $t_{support}$ of the second and fourth time period, the power of the second close illuminator and the first close illuminator can be adapted to be high enough to produce a glint which can be identified in the image but at the same time be low enough not to reduce the contrast between a representation of a pupil and an iris in the image.

For BP images, a main illuminator for the first image sensor is the first close illuminator arranged to capture BP images by the first image sensor, e.g. arranged coaxially with or near the first image sensor. A main illuminator for the second image sensor is the second close illuminator arranged to capture BP images by the second image sensor, e.g. arranged coaxially with or near the second image sensor. Illumination of the first image sensor during exposure by means of the second close illuminator may result in reduced contrast between a representation of a pupil and an iris, respectively, in the resulting image. Similarly, illumination of the second image sensor during exposure by means of the first close illuminator may result in reduced contrast between a representation of a pupil and an iris, respectively, in the resulting image. As the first close illuminator and the second close illuminator are to be used as main illuminator for the first image sensor and the second image sensor, respectively, during exposure, the exposure of the first image sensor and the exposure of the second image sensor have to be separated in time.

For BP images, a support illuminator for the first image sensor is said one of the one or more far illuminators arranged to capture DP images by the first image sensor, e.g. arranged non-coaxially with or far from the first image sensor. A support illuminator for the second image sensor is said one of the one or more illuminators arranged to capture DP images by the second image sensor, e.g. arranged non-coaxially with or far from the second image sensor. Illumination of the first image sensor during exposure by means of said one of the one or more far illuminators generally does not result in substantially reduced contrast between a representation of a pupil and an iris, respectively, in the resulting image. Similarly, illumination of the second image sensor during exposure by means of said one of the one or more far illuminators generally does not result in substantially reduced contrast between a representation of a pupil and an iris, respectively, in the resulting image. Hence, illumination of the first image sensor during exposure by means of said one of the one or more far illuminators can be concurrent with illumination of the first image sensor by means of the first close illuminator. Similarly, illumination of the second image sensor during exposure by means of said one of the one or more far illuminators can be concurrent with illumination of the second image sensor by means of the second close illuminator.

One way of limiting the time from the start of the exposure time of the image sensor of the first image sensor and the second image sensor for which the exposure time starts first to the end of the exposure time of the image sensor of the first image sensor and the second image sensor for which the exposure time ends last for BP images, is to illuminate the first image sensor during a first time period which is $t_{main}$ long by means of the first close illuminator and to illuminate the first image sensor also by means of said one of the one or more far illuminators during a second time period which is $t_{support}$ long at the end of the first time period, where $t_{support}$ is shorter than $t_{main}$, and then after the end of the first time period illuminate the second image sensor during a third time period which is $t_{main}$ long by means of the second close illuminator and to illuminate the second image sensor also by means of said one of the one or more far illuminators during a fourth time period which is $t_{support}$ long at the beginning of the third time period. By doing so, said one of the one or more far illuminators can be continuously lit during the final $t_{support}$ long part of the first time period and the first $t_{support}$ long part of the third time period. In alternative the time that said one of the one or more far illuminators is lit up can be divided into two periods which overlap any part of the first time period and the third time period, respectively.

The length $t_{support}$ of the second and fourth time period during which said one of the one or more far illuminators is lit should be long enough to produce a glint which can be identified in the image but at the same time be short enough not to reduce the contrast between a representation of a pupil and an iris in the image. In alternative or in combination with adapting the length $t_{support}$ of the second and fourth time period, the power of said one of the one or more far illuminators can be adapted to be high enough to produce a glint which can be identified in the image but at the same time be low enough not to reduce the contrast between a representation of a pupil and an iris in the image.

BRIEF DESCRIPTION OF THE DRAWINGS

Exemplifying embodiments will be described below with reference to the accompanying drawings, in which.

All the figures are schematic and generally only show parts which are necessary in order to elucidate the respective embodiments, whereas other parts may be omitted or merely suggested.

DESCRIPTION

Figure 1:
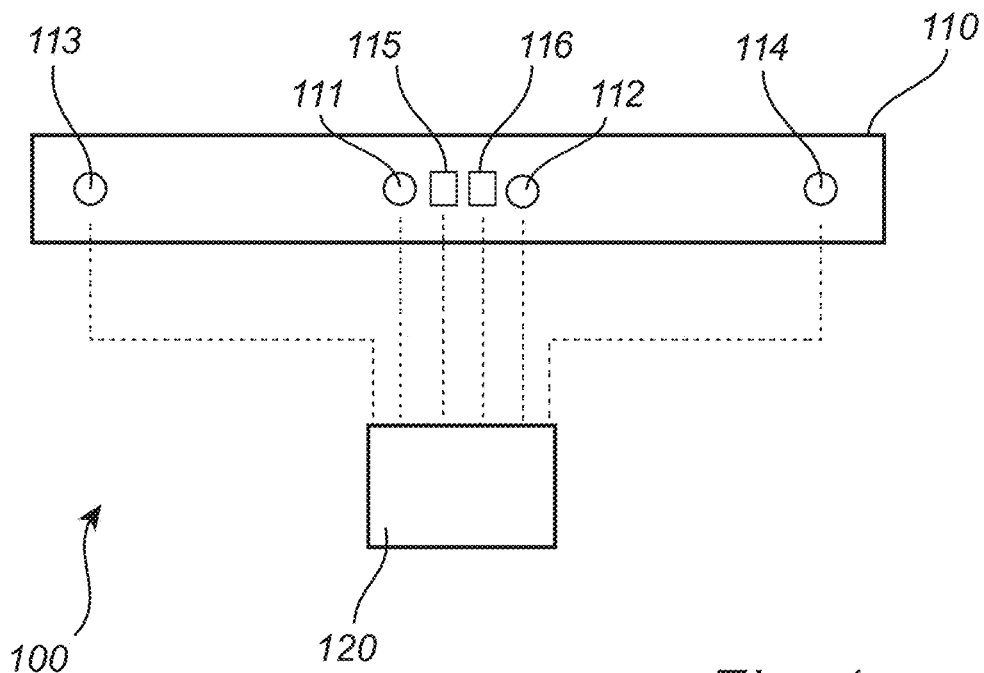
FIG. 1 shows an example of an eye tracking system in which embodiments can be implemented.

FIG. 1 shows an example of an eye/gaze tracking system 100, in which embodiments may be implemented. The system 100 comprises illuminators 111-114 for illuminating the eyes of a user, and light sensors 115, 116 for capturing images of the eyes of the user. The illuminators 111-114 may for example be light emitting diodes emitting light in the infrared frequency band, or in the near infrared frequency band. The light sensors 115, 116 may for example be an image sensor, such as a complementary metal oxide semiconductor (CMOS) image sensor or a charged coupled device (CCD) image sensor. The image sensor may consist of an integrated circuit containing an array of pixel sensors, each pixel containing a photodetector and an active amplifier. The image sensor is capable of converting light into digital signals. In reality, as an example, it could be Infrared image sensor or IR image sensor
RGB sensor
RGBW sensor
RGB or RGBW sensor with IR filter First illuminators 111, 112, close illuminators 111, 112 herein, are arranged coaxially with (or close to) the light sensors 115, 116, respectively, so that the light sensors 115, 116 may capture bright pupil images of the eyes of a user (subject). Due to the coaxial arrangement of the close illuminators 111, 112 and the light sensors 115, 116, respectively, light reflected from the retina of an eye returns back out through the pupil towards the light sensors 115, 116, so that the pupil appears brighter than the iris surrounding it in images where the close illuminators 111, 112 illuminate the eye. Second illuminators 113, 114, far illuminators 113, 114 herein, are arranged non-coaxially with (or further away from) the light sensors 115, 116 for capturing dark pupil images. Due to the non-coaxial arrangement of the far illuminators 113, 114 and the light sensors 115, 116 light reflected from the retina of an eye does not reach the light sensors 115, 116 and the pupil appears darker than the iris surrounding it in images where the far illuminators 113, 114 illuminate the eye. The close illuminators 111, 112 may for example be used to illuminate the eye of a user if the user has a good/high BP response, i.e. high contrast between representations of pupil and iris in BP images, and the far illuminators 113, 114 may for example be used to illuminate the eye of a user if the user has a bad/low BP response, i.e. low contrast between representations of pupil and iris in BP images.

The eye tracking system 100 also comprises circuitry 120 (for example including one or more processors) for processing the images captured by the light sensors 115, 116. The circuitry 120 may for example be connected to the light sensors 115, 116 and the illuminators 111-114 via a wired or a wireless connection. In another example, circuitry 120 in the form of one or more processors may be provided in one or more stacked layers below the light sensitive surface of the light sensors 115, 116.

Figure 2:
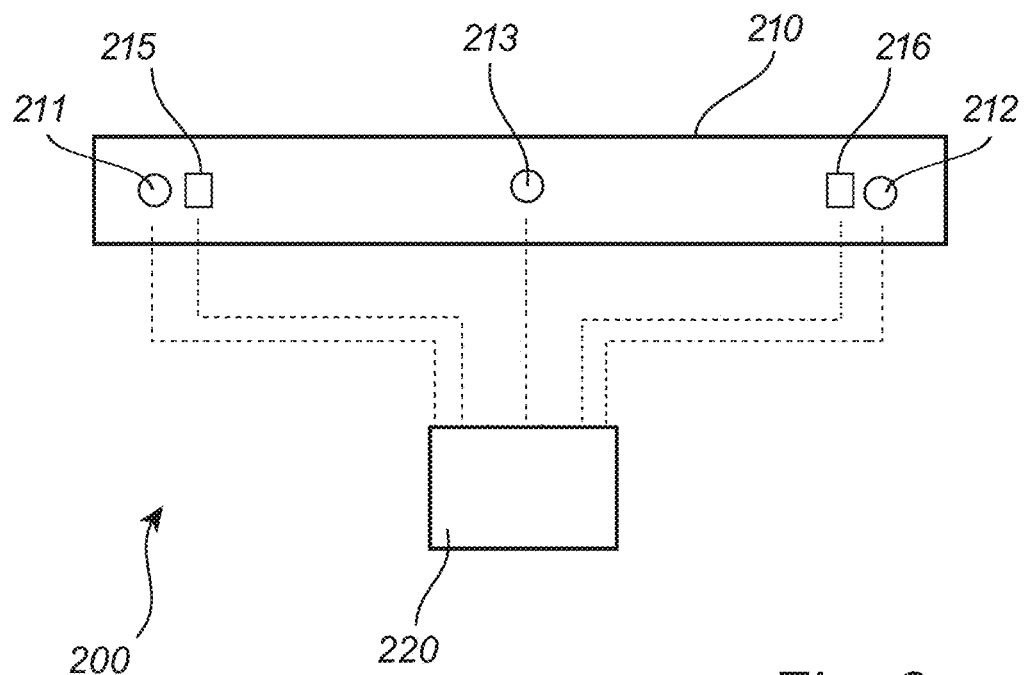
FIG. 2 shows another example of an eye tracking system in which embodiments can be implemented.

FIG. 2 shows another example of an eye/gaze tracking system 200, in which embodiments may be implemented. First illuminators 211, 212, close illuminators 211, 212 herein, are arranged coaxially with (or close to) the light sensors 215, 216, respectively, so that the light sensors 215, 216 may capture BP images of the user's eyes. A further illuminator 213, far illuminator 213 herein, is arranged non-coaxially with (or further away from) the light sensors 215, 216 for capturing DP images. The eye tracking system 200 also comprises circuitry 220 (for example including one or more processors) for processing the images captured by the light sensors 215, 216.

In the systems described with reference to FIG. 1 and FIG. 2, the illuminators 111-114; 211-213 are arranged in an eye tracking module 110; 210 placed below a display watched by the user. This arrangement serves only as an example. It will be appreciated that more illuminators and more light sensors may be employed for eye tracking, and that such illuminators and light sensors may be distributed in many different ways relative to displays watched by the user. For example, further far illuminators may be provided to be used as support illuminators for BP images and as support or main illuminators for DP images. Such further illuminators may be positioned in order to take account for further gaze directions of the user to produce glints that are positioned close to the center of the cornea. For example, further far illuminators can be positioned above a display to take account for gaze directions closer to the top of the display.

Furthermore, each of the close illuminators 111, 112; 211, 212 in FIG. 1 and FIG. 2, respectively, may be located as a circle around a respective one of the light sensors 115, 116; 215, 216, respectively, to be truly coaxially arranged.

Figure 3:
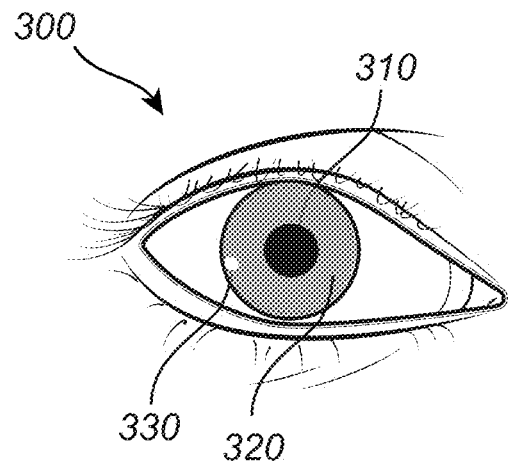
FIG. 3 shows an example DP image of an eye.

FIG. 3 shows an example of a first DP image of an eye 300, captured by one of the light sensors 115, 116; 215, 216.

DP images are used in order to achieve a best contrast as possible between a representation of a pupil 310 and an iris 320 of the eye, respectively, for users with low BP response. A second image (not shown) is captured by the other one of the light sensors 115, 116; 215, 216. The circuitry 120; 220 may for example employ image processing (such as digital image processing) for extracting features in the first image (and the second image). The circuitry 120; 220 may for example employ pupil center cornea reflection (PCCR) eye tracking to determine a position of the eye 300 in space and a point of gaze or gaze direction of the eye 300. In PCCR eye tracking, using one of the systems of FIG. 1 and FIG. 2, the position of the eye 300 in space and the point of gaze or gaze direction of the eye 300 is determined based on an estimation of a position of a center of the representation of the pupil 310, a position of a center of a glint 330 at the eye 300 in the first image, and corresponding estimations of a position of a center of a pupil, a position of a center of a glint at the eye in the second image.

Figure 4:
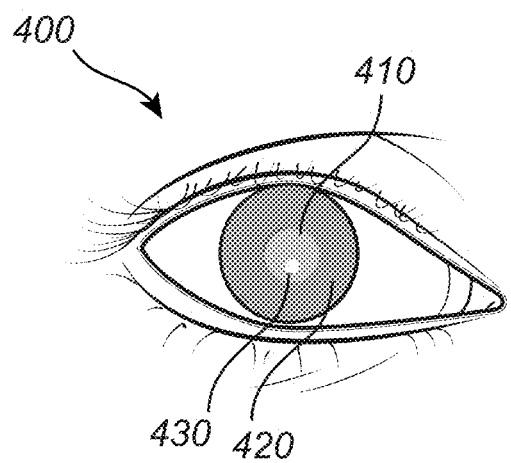
FIG. 4 shows an example BP image of an eye.

FIG. 4 shows an example of a first BP image of an eye 300, captured by one of the light sensors 115, 116; 215, 216. BP images are used in order to achieve a best contrast as possible between a representation of a pupil 410 and an iris 420 of the eye, respectively, for users with high BP response. A second image (not shown) is captured by the other one of the light sensors 115, 116; 215, 216. The circuitry 120; 220 may for example employ image processing (such as digital image processing) for extracting features in the first image (and the second image). The circuitry 120; 220 may for example employ pupil center cornea reflection (PCCR) eye tracking to determine a position of the eye 400 in space and a point of gaze or gaze direction of the eye 400. In PCCR eye tracking, using one of the systems of FIG. 1 and FIG. 2, the position of the eye 400 in space and the point of gaze or gaze direction of the eye 400 is determined based on an estimation of a position of a center of the representation of the pupil 410, a position of a center of a glint 430 at the eye 300 in the first image, and corresponding estimations of a position of a center of a pupil, a position of a center of a glint at the eye in the second image.

Figure 5A:
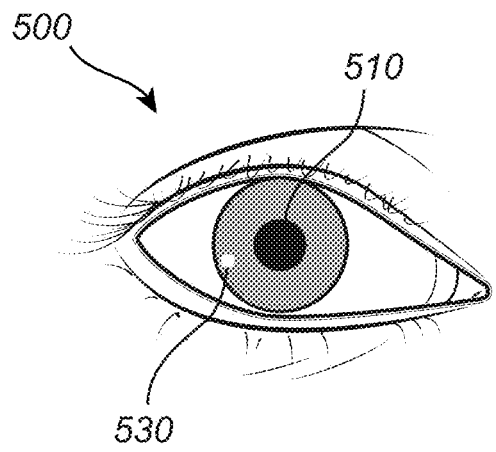
FIG. 5a shows a DP image of an eye with one peripherally positioned glint using a main illuminator only.

FIG. 5a shows a DP image of an eye with one peripherally positioned glint using a main illuminator only. When only a main illuminator is lit during exposure of a light sensor, such as the rightmost far illuminator 114 for the leftmost image sensor 115 in the system 100 shown in FIG. 1, the DP image of an eye of a user having a central gaze direction such that the pupil is centered in the image of the eye, a glint 530 in the DP image may be located far to the left in the eye in relation to the representation of the pupil 510 in the image. This may correspond to the glint being located outside the central region of the cornea which is approximately spherical which in turn will produce less accurate results in relation to eye/gaze tracking.

Figure 5B:
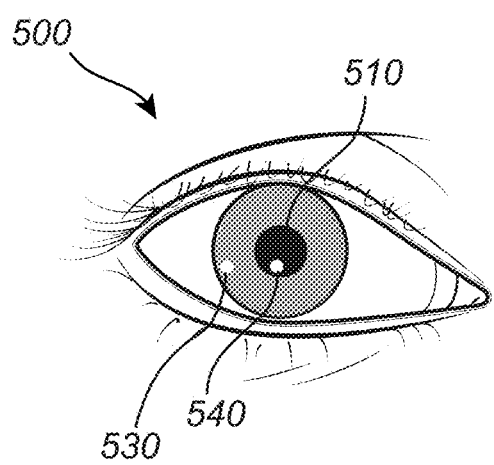
FIG. 5b shows a DP image of an eye with one peripherally positioned glint and one centrally positioned glint using a main illuminator and a support illuminator.

FIG. 5b shows a DP image of an eye with one peripherally positioned glint and one centrally positioned glint using a main illuminator and a support illuminator. In addition to a main illuminator lit during exposure of a light sensor, such as the rightmost far illuminator 114 for the leftmost image sensor 115 in the system 100 shown in FIG. 1, a further support illuminator may be lit during exposure of the light sensor 115, such as the close illuminator 112 associated with the other images sensor 116 of the system 100 in FIG. 1. By using the close illuminator 112 of the other image sensor 116, no BP effect will be caused in the image of the light sensor 115. Furthermore, since the close illuminator 112 of the other image sensor 116 is centrally positioned in the system 100, the resulting glint 540 will be more centrally positioned in relation to the representation of the pupil 510 in an image of an eye of a user having a central gaze direction such that the pupil is centered in the image of the eye. This may correspond to the glint being located inside the central region of the cornea which is approximately spherical which in turn will produce more accurate results in relation to eye/gaze tracking.

Figure 6A:
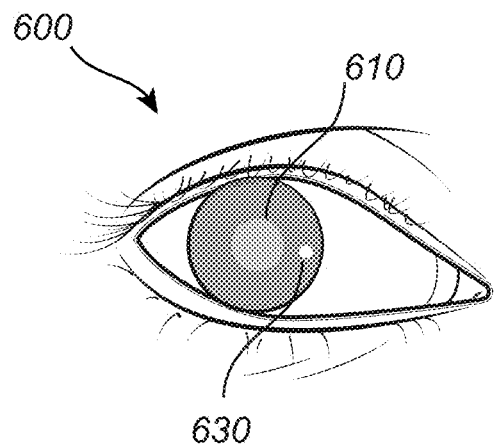
FIG. 6a shows a BP image of an eye with one peripherally positioned glint using a main illuminator only.

FIG. 6a shows a BP image of an eye with one peripherally positioned glint using a main illuminator only. When only a main illuminator is lit during exposure of a light sensor, such as the close illuminator 111 associated with the leftmost image sensor 115 in the system 100 shown in FIG. 1, the BP image of an eye of a user having a gaze direction far to the right such that the pupil is positioned far to the left in the image of the eye, a glint 630 in the DP image may be located far to the right in the eye in relation to the representation of the pupil 610 in the image. This may correspond to the glint being located outside the central region of the cornea which is approximately spherical which in turn will produce less accurate results in relation to eye/gaze tracking.

Figure 6B:
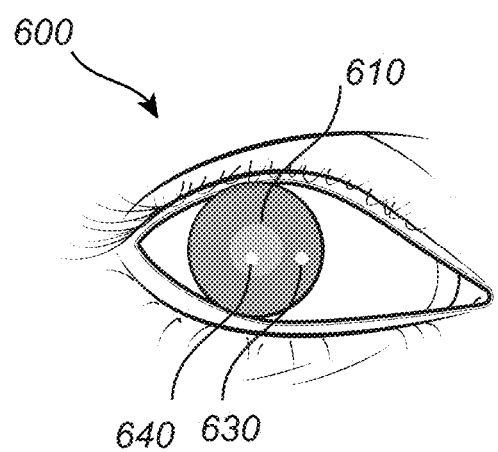
FIG. 6b shows a BP image of an eye with one peripherally positioned glint and one centrally positioned glint using a main illuminator and a support illuminator.

FIG. 6b shows a BP image of an eye with one peripherally positioned glint and one centrally positioned glint using a main illuminator and a support illuminator. In addition to a main illuminator lit during exposure of a light sensor, such as the close illuminator 111 associated with the leftmost image sensor 115 in the system 100 shown in FIG. 1, a further support illuminator may be lit during exposure of the light sensor 115, such as the rightmost far illuminator 114 of the system 100 in FIG. 1. By using the rightmost far illuminator 114, the resulting glint 640 will be more centrally positioned in relation to the representation of the pupil in an image of an eye of a user having a gaze direction far to the right such that the pupil is located far to the left in the image of the eye. This may correspond to the glint being located inside the central region of the cornea which is approximately spherical which in turn will produce more accurate results in relation to eye/gaze tracking.

Figure 7A:
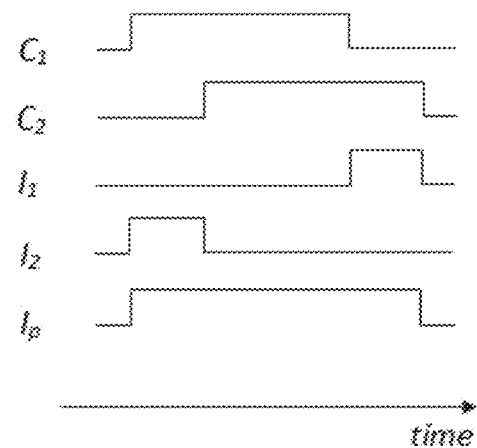
FIG. 7a shows a timing diagram for camera exposure and illuminators for DP images.

FIG. 7a shows a timing diagram for camera exposure and illuminators for DP images. A first image sensor $C_1$ and a second image sensor $C_2$ are each exposed during a time period which is $t_{main}$ long. Exposure is indicated as a high in the diagram associated to each of the first image sensor $C_1$ and the second image sensor $C_2$, respectively. During the exposure of the first image sensor $C_1$ and the exposure of the second image sensor $C_2$ a main illuminator $I_p$ is lit.

The main illuminator $I_p$ for the first image sensor $C_1$ and the second image sensor $C_2$ is an illuminator arranged to capture DP images by the respective image sensor, e.g. arranged non-coaxially with or far from the respective sensor, (such as the leftmost far illuminator 113 or the rightmost far illuminator 114 of the system 100 of FIG. 1). Since the main illuminator $I_p$ for both image sensors during exposure is the same, illumination of the first image sensor $C_1$ and the second image sensor $C_2$ during exposure by means of the main illuminator $I_p$ can be concurrent as indicated in the diagram related to the main illuminator $I_p$ in FIG. 7a.

Generally, in relation to the system 100 of FIG. 1, the leftmost far illuminator 113 would be used as the main illuminator $I_p$ if the user is looking to the left and the rightmost far illuminator 114 is used as the main illuminator $I_p$ if the user is looking to the right. Furthermore, selection of which of the one or more far illuminators 113, 114 should be used as a main illuminator for the first image sensor 115 and the second image sensor 116 for a time frame (i.e. a period of time in which an image is captured for the first image sensor and the second image sensor, respectively)

may be done based on eye tracking data from a previous frame. For example, if the eye tracking data from a previous frame indicates that the user is looking to the right, an illuminator 114 of the one or more far illuminators 113, 114 being located to the right is selected as a main illuminator.

For DP images, a support illuminator $I_2$ for the first image sensor $C_1$ is an illuminator arranged to capture BP images by the second image sensor $C_2$, e.g. arranged coaxially with or near the second image sensor $C_2$ (such as the close illuminator 112 associated with the second image sensor 116 of the system 100 of FIG. 1). Furthermore, a support illuminator $I_1$ for the second image sensor $C_2$ is an illuminator arranged to capture BP images by the first image sensor $C_1$, e.g. arranged coaxially with or near the first image sensor $C_1$ (such as the close illuminator 111 associated with the first image sensor 115 of the system 100 of FIG. 1). Illumination of the first image sensor $C_1$ during exposure by means of the close illuminator associated with the first image sensor $C_1$ and used as a support illuminator for the second image sensor $C_2$ will result in a BP effect and may thus result in reduced contrast between a representation of a pupil and an iris, respectively, in the resulting image. Similarly, illumination of the second image sensor $C_2$ during exposure by means of the close illuminator associated with the second image sensor $C_2$ and used as a support illuminator for the first image sensor $C_1$ will result in a BP effect and thus may result in reduced contrast between a representation of a pupil and an iris, respectively, in the resulting image. Hence, the illumination of the first image sensor $C_1$ during exposure by means of the close illuminator associated with the second image sensor $C_2$, used as a support illuminator $I_2$ for the first image sensor $C_1$, has to be separated in time from exposure of the second image sensor $C_2$. Similarly, the illumination of the second image sensor $C_2$ during exposure by means of the close illuminator associated with the first image sensor $C_1$, used as a support illuminator $I_1$ for the second image sensor $C_2$, has to be separated in time from exposure of the first image sensor $C_1$.

One way of limiting the time from the start of the exposure of the image sensor of the first image sensor and the second image sensor for which exposure starts first to the end of the exposure of the image sensor of the first image sensor and the second image sensor for which exposure ends last for DP images, is shown in the time diagram of FIG. 7a. The first image sensor $C_1$ is illuminated a first time period which is $t_{main}$ long by means of the main illuminator $I_p$. During a second time period which is $t_{support}$ long at the beginning of and overlapping the first time period, where $t_{support}$ is shorter than $t_{main}$, the first image sensor $C_1$ is illuminated also by the support illuminator $I_2$. At the end of the second time period, i.e. $t_{support}$ from the start of the exposure of the first image sensor $C_1$, the second image sensor $C_2$ is illuminated during a third time period which is $t_{main}$ long by means of the main illuminator $I_p$. During a fourth time period which is $t_{support}$ long at the end of and overlapping the third time period and starting at the end of the first time period, the second image sensor $C_2$ is illuminated also by the support illuminator $I_1$.

By doing so, the support illuminator $I_2$ for the first image sensor $C_1$ which is the close illuminator for the second image sensor $C_2$, is not lit during the third time period, i.e. the exposure time of the second image sensor $C_2$. Similarly, the support illuminator $I_1$ for the second image sensor $C_2$ which is the close illuminator for the first image sensor $C_1$, is not lit during the first time period, i.e. the exposure time of the first image sensor $C_1$. The total time from the start of the exposure of the first image sensor $C_1$ to the end of the exposure of the second image sensor $C_2$ is $t_{main} + t_{support}$ long.

The length $t_{support}$ of the time periods during which the support illuminator $I_2$ of the first image sensor $C_1$ and the support illuminator $I_1$ of the second image sensor $C_2$, respectively, are lit, should be long enough to produce a glint which can be identified in the image but at the same time be short enough not to reduce the contrast between a representation of a pupil and an iris in the image. In alternative or in combination with adapting the length $t_{support}$ of the second and fourth time period, the power of the support illuminator $I_2$ for the first image sensor $C_1$ and the support illuminator $I_1$ for the second image sensor $C_2$ can be adapted to be high enough to produce a glint which can be identified in the image but at the same time be low enough not to reduce the contrast between a representation of a pupil and an iris in the image.

Figure 7B:
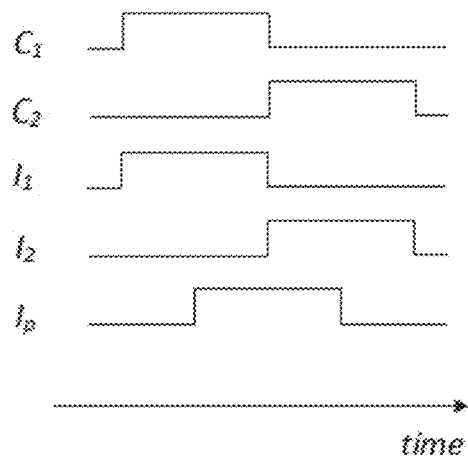
FIGS. 7b-c show timing diagrams for camera exposure and illuminators for BP images.

FIG. 7b shows a timing diagram for camera exposure and illuminators for BP images. A first image sensor $C_1$ and a second image sensor $C_2$ are each exposed during a time period which is $t_{main}$ long. Exposure is indicated as a high in the diagram associated to each of the first image sensor $C_1$ and the second image sensor $C_2$, respectively. During the exposure of the first image sensor $C_1$ a main illuminator $I_1$ is lit and during the exposure of the second image sensor $C_2$ a main illuminator $I_2$ is lit.

The main illuminator $I_1$ for the first image sensor $C_1$ is an illuminator arranged to capture BP images by the first image sensor $C_1$, e.g. arranged coaxially with or close to the first image sensor $C_1$ (such as the close illuminator 111 associated with the leftmost image sensor 115 of the system 100 of FIG. 1). The main illuminator $I_2$ for the second image sensor $C_2$ is an illuminator arranged to capture BP images by the second image sensor $C_2$, e.g. arranged coaxially with or close to the respective sensor (such as the close illuminator 112 associated with the second image sensor $C_2$ of the system 100 of FIG. 1).

The support illuminator $I_p$ for the first image sensor $C_1$ and the second image sensor $C_2$ is an illuminator arranged to capture DP images by the respective image sensor, e.g. arranged non-coaxially with or far from the respective sensor, (such as the leftmost far illuminator 113 or the rightmost far illuminator 114 of the system 100 of FIG. 1). Generally, in relation to the system 100 of FIG. 1, the leftmost far illuminator 113 would be used as the support illuminator $I_p$ if the user is looking to the left and the rightmost far illuminator 114 is used as the support illuminator $I_p$ if the user is looking to the right. Furthermore, selection of which of the far illuminators 113, 114 to be used as a support illuminator for the first image sensor 115 and the second image sensor 116 for a time frame (i.e. a period of time in which an image is captured for the first image sensor and the second image sensor, respectively) may be done based on eye tracking data from a previous frame. For example, if the eye tracking data from a previous frame indicates that the user is looking to the left, an illuminator 113 of the one or more far illuminators 113, 114 being located to the left is selected as a support illuminator.

Illumination of the first image sensor $C_1$ during exposure by means of the second close illuminator $I_2$ may result in a reduced contrast between a representation of a pupil and an iris, respectively, in the resulting image. Similarly, illumination of the second image sensor $C_2$ during exposure by means of the first close illuminator $I_1$ may result in a reduced contrast between a representation of a pupil and an iris, respectively, in the resulting image. As the first close illuminator $I_1$ and the second close illuminator $I_2$ are to be used as main illuminator for the first image sensor $C_1$ and the second image sensor $C_2$, respectively, during exposure, the exposure of the first image sensor and the exposure of the second image sensor have to be separated in time.

One way of limiting the time from the start of the exposure of the image sensor of the first image sensor and the second image sensor for which exposure starts first to the end of the exposure of the image sensor of the first image sensor and the second image sensor for which exposure ends last for BP images, is shown in the time diagram of FIG. 7b. The first image sensor $C_1$ is illuminated a first time period which is $t_{main}$ long by means of the main illuminator $I_1$ associated with the first image sensor $C_1$. During a second time period which is $t_{support}$ long at the end of and overlapping the first time period, where $t_{support}$ is shorter than $t_{main}$, the first image sensor $C_1$ is illuminated also by the support illuminator $I_p$. The end of the second time period coincides with the end of the first time period and is $t_{main}$ from the start of the exposure of the first image sensor $C_1$. At the end of the first time period, the second image sensor $C_2$ is illuminated during a third time period which is $t_{main}$ long by means of the main illuminator $I_2$ associated with the first image sensor $C_2$. During a fourth time period which is $t_{support}$ long at the beginning of and overlapping the third time period and starting at the end of the first time period, the second image sensor $C_2$ is illuminated also by the support illuminator $I_p$.

By doing so, the main illuminator $I_1$ for the first image sensor $C_1$ is not lit during the third time period, i.e. the exposure time of the second image sensor $C_2$. Similarly, the main illuminator $I_2$ for the second image sensor $C_2$ is not lit during the first time period, i.e. the exposure time of the first image sensor $C_1$. The total time from the start of the exposure of the first image sensor $C_1$ to the end of the exposure of the second image sensor $C_2$ is $t_{main}+t_{main}$ long.

The length $t_{support}$ of the time periods during which the support illuminator $I_p$ is lit for the first image sensor $C_1$ and the support illuminator $I_p$ is lit for the second image sensor $C_2$, respectively, should be long enough to produce a glint which can be identified in the image but at the same time be short enough not to reduce the contrast between a representation of a pupil and an iris in the image. In alternative or in combination with adapting the length $t_{support}$ of the second and fourth time period, the power of the support illuminator $I_p$ can be adapted to be high enough to produce a glint which can be identified in the image but at the same time be low enough not to reduce the contrast between a representation of a pupil and an iris in the image.

Figure 7C:
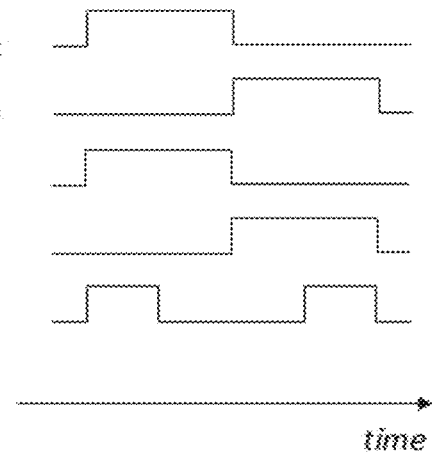

FIG. 7c shows a timing diagram for camera exposure and illuminators for BP images similar to the timing diagram in FIG. 7b. The timing for the exposure of the first image sensor $C_1$, the main illuminator $I_1$ for the first image sensor $C_1$, the exposure of the second image sensor $I_2$, and the main illuminator $I_2$ for the second image sensor $C_2$ is the same as in FIG. 7b. However, the timing for the support illuminator $I_p$ for the first image sensor $C_1$ and for the second image sensor $C_2$ differs in that the second time period during which the support illuminator $I_p$ is lit for the first image sensor $C_1$ starts at the beginning of the first time period, i.e. at the start of the exposure of the first image sensor $C_1$ and the fourth time period during which the support illuminator $I_p$ is lit for the second image sensor $C_2$ ends at the end of the third time period, i.e. at the end of the exposure of the first image sensor $C_2$.

Figure 8:
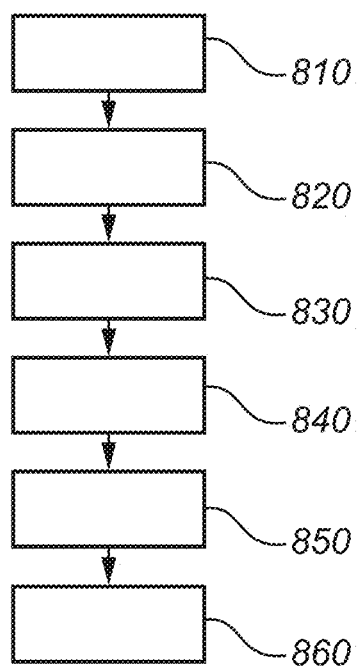
FIGS. 8-9 are flow charts of methods according to embodiments.

FIG. 8 shows a flow chart of a method in an eye tracking system. The system comprises a first image sensor, a second image sensor, a first close illuminator arranged to capture bright pupil images by the first image sensor, a second close illuminator arranged to capture bright pupil images by the second image sensor and one or more far illuminators arranged to capture dark pupil images by the first image sensor and the second image sensor. In the method one of the one or more far illuminators is maintained 810 activated during an exposure time of the first image sensor. The second close illuminator is maintained 820 activated during a portion of the exposure time of the first image sensor and the first close illuminator is maintained 830 deactivated during the exposure time of the first image sensor. Said one of the one or more far illuminators is also maintained 840 activated during an exposure time of the second image sensor. Furthermore, the first close illuminator is maintained 850 activated during a portion of the exposure time of the second image sensor, and the second close illuminator is maintained 860 deactivated during the exposure time of the second image sensor.

Figure 9:
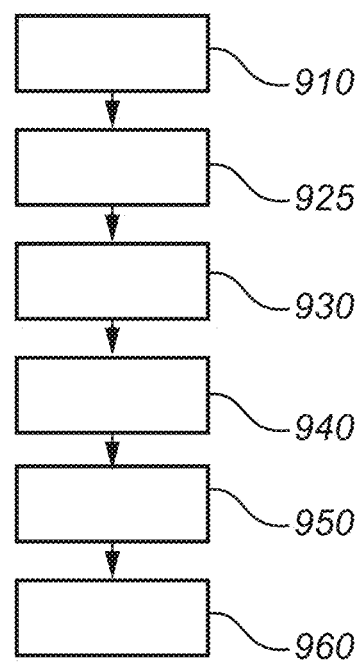

FIG. 9 shows a flow chart of a method in an eye tracking system. The system comprises a first image sensor, a second image sensor, a first close illuminator arranged to capture bright pupil images by the first image sensor, a second close illuminator arranged to capture bright pupil images by the second image sensor and one or more far illuminators arranged to capture dark pupil images by the first image sensor and the second image sensor. In the method the first close illuminator is maintained 910 activated during an exposure time of the first image sensor, and the second close illuminator is maintained 920 deactivated during the exposure time of the first image sensor. Furthermore, one of the one or more far illuminators is maintained 930 activated during a portion of the exposure time of the first image sensor. The second close illuminator is maintained 940 activated during an exposure time of the second image sensor and the first close illuminator is maintained 950 deactivated during the exposure time of the second image sensor. Furthermore, said one of the one or more far illuminators is maintained 960 activated during a portion of the exposure time of the second image sensor.

It is to be noted that the steps in FIGS. 8 and 9 relates to maintaining of illuminators activated during a period of time. The order of the steps is not intended to illustrate a sequential order of the steps. Instead, some of the steps may be performed in parallel to each other.

A person skilled in the art realizes that the present invention is by no means limited to the preferred embodiments described above. On the contrary, many modifications and variations are possible within the scope of the appended claims. For example, the person skilled in the art realizes that the methods described herein may be performed by many other eye/gaze tracking systems than the example eye/gaze tracking systems 100 and 200 shown in FIGS. 1 and 2. Furthermore, methods and systems have been described for one eye. However, a person skilled in the art realizes that the methods may be performed for two eyes also where the result for both eyes is taken into account in each step.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

The invention claimed is:

1. A method of controlling illuminators in an eye tracking system, the method comprising:
    activating a main illuminator and a support illuminator during an exposure time of a first image sensor, wherein the main illuminator and the support illuminator are in an eye tracking system and wherein the main illuminator is one of a first close illuminator a second close illuminator, or one or more far illuminators, and wherein the support illuminator is one of the first close illuminator, the second close illuminator, or the one or more far illuminators and wherein the first close illuminator and second close illuminator are to illuminate an eye for bright pupil image capture by an image sensor and the far illuminators are to illuminate the eye for dark pupil image capture;
    maintaining one of the first close illuminator or the second close illuminator deactivated during the exposure time of the first image sensor;
    activating the main illuminator and the support illuminator during an exposure time of a second image sensor, wherein the main illuminator is one of the first close illuminator, the second close illuminator, or the one or more far illuminators, and wherein the support illuminator is one of the first close illuminator, the second close illuminator, or the one or more far illuminators;
    maintaining one of the first close illuminator or the second close illuminator deactivated during the exposure time of the second image sensor; wherein
    the main illuminator during the exposure time of the first image sensor is the first close illuminator to capture a bright pupil image;
    the support illuminator during the exposure time of the first image sensor is the one or more of the far illuminators to capture a dark pupil image;
    the main illuminator during the exposure time of the second image sensor is the second close illuminator to capture a bright pupil image; and
    the support illuminator during the exposure time of the second image sensor is the one or more of the far illuminators to capture dark pupil images.

2. The method of claim 1, further comprising:
    the main illuminator during the exposure time of the first image sensor is the one or more of the far illuminators;
    the support illuminator during the exposure time of the first image sensor is the second close illuminator;
    the main illuminator during the exposure time of the second image sensor is the one or more of the far illuminators; and
    the support illuminator during the exposure time of the second image sensor is the first close illuminator.

3. The method of claim 1, wherein the first close illuminator is arranged coaxially with or near the first image sensor, the second close illuminator is arranged coaxially or near the second image sensor and the one or more far illuminators are arranged non-coaxially with or far from the first image sensor and the second image sensor.

4. The method of claim 3, wherein the first image sensor and the second image sensor are arranged centrally in a horizontal direction in the system, and wherein the one or more far illuminators include a first far illuminator arranged to the left horizontally from the first image sensor and the second image sensor, and a second far illuminator arranged to the right horizontally from the first image sensor and the second image sensor.

5. The method of claim 4, further comprising:
    activating the first far illuminator during the exposure time of the first image sensor and during the exposure time of the second image sensor on a condition that a gaze direction is estimated to be to the left; and
    activating the second far illuminator during the exposure time of the first image sensor and during the exposure time of the second image sensor on a condition that a gaze direction is estimated to be to the right.

6. The method of claim 4, further comprising:
    activating the first far illuminator during a portion of the exposure time of the first image sensor on a condition that a gaze direction is estimated to be to the left; and
    activating the second far illuminator during a portion of the exposure time of the first image sensor on a condition that a gaze direction is estimated to be to the right;
    activating the first far illuminator during a portion of the exposure time of the second image sensor on a condition that a gaze direction is estimated to be to the left; and
    activating the second far illuminator during a portion of the exposure time of the second image sensor on a condition that a gaze direction is estimated to be to the right.

7. The method of claim 1, further comprising:
    activating one of the one or more far illuminators based upon eye tracking data from a previous frame during the exposure time of the first image sensor; and
    activating one of the one or more far illuminators based upon eye tracking data from a previous frame during the exposure time of the second image sensor.

8. An eye tracking system comprising:
    a first image sensor;
    a second image sensor;
    a first close illuminator;
    a second close illuminator;
    one or more far illuminators; and
    circuitry configured to:
    activating a main illuminator and a support illuminator during an exposure time of the first image sensor, wherein the main illuminator is one of the first close illuminator, the second close illuminator, or the one or more far illuminators, and wherein the support illuminator is one of the first close illuminator, the second close illuminator, or the one or more far illuminators and wherein the first close illuminator and second close illuminator are to illuminate an eye for bright pupil image capture by an image sensor and the far illuminators are to illuminate the eye for dark pupil image capture;

maintaining one of the first close illuminator or the second close illuminator deactivated during the exposure time of the first image sensor;

activating the main illuminator and the support illuminator during an exposure time of the second image sensor, wherein the main illuminator is one of the first close illuminator, the second close illuminator, or the one or more far illuminators, and wherein the support illuminator is one of the first close illuminator, the second close illuminator, or the one or more far illuminators;

maintaining one of the first close illuminator or the second close illuminator deactivated during the exposure time of the second image sensor; wherein the main illuminator during the exposure time of the first image sensor is the first close illuminator to capture a bright pupil image;

the support illuminator during the exposure time of the first image sensor is the one or more of the far illuminators to capture a dark pupil image;

the main illuminator during the exposure time of the second image sensor is the second close illuminator to capture a bright pupil image; and the support illuminator during the exposure time of the second image sensor is the one or more of the far illuminators to capture dark pupil images.

9. The eye tracking system of claim 8, further comprising:
the main illuminator during the exposure time of the first image sensor is the one or more of the far illuminators;
the support illuminator during the exposure time of the first image sensor is the second close illuminator;
the main illuminator during the exposure time of the second image sensor is the one or more of the far illuminators; and
the support illuminator during the exposure time of the second image sensor is the first close illuminator.

10. The eye tracking system of claim 8, further comprising:
activating one of the one or more far illuminators based upon eye tracking data from a previous frame during the exposure time of the first image sensor; and
activating one of the one or more far illuminators based upon eye tracking data from a previous frame during the exposure time of the second image sensor.

11. A non-transitory machine readable medium having instructions, the instructions executable by one or more processors to perform operations comprising:
activating a main illuminator and a support illuminator during an exposure time of a first image sensor, wherein the main illuminator and the support illuminator are in an eye tracking system and wherein the main illuminator is one of a first close illuminator a second close illuminator, or one or more far illuminators, and wherein the support illuminator is one of the first close illuminator, the second close illuminator, or the one or more far illuminators and wherein the first close illuminator and second close illuminator are to illuminate an eye for bright pupil image capture by an image sensor and the far illuminators are to illuminate the eye for dark pupil image capture;

maintaining one of the first close illuminator or the second close illuminator deactivated during the exposure time of the first image sensor;

activating the main illuminator and the support illuminator during an exposure time of the second image sensor, wherein the main illuminator is one of the first close illuminator, the second close illuminator, or the one or more far illuminators, and wherein the support illuminator is one of the first close illuminator, the second close illuminator, or the one or more far illuminators;

maintaining one of the first close illuminator or the second close illuminator deactivated during the exposure time of the second image sensor; wherein the main illuminator during the exposure time of the first image sensor is the first close illuminator to capture a bright pupil image;

the support illuminator during the exposure time of the first image sensor is the one or more of the far illuminators to capture a dark pupil image;

the main illuminator during the exposure time of the second image sensor is the second close illuminator to capture a bright pupil image; and the support illuminator during the exposure time of the second image sensor is the one or more of the far illuminators to capture dark pupil images.

12. The system of claim 11, further comprising:
the main illuminator during the exposure time of the first image sensor is the one or more of the far illuminators;
the support illuminator during the exposure time of the first image sensor is the second close illuminator;
the main illuminator during the exposure time of the second image sensor is the one or more of the far illuminators; and
the support illuminator during the exposure time of the second image sensor is the first close illuminator.

13. The system of claim 11, further comprising:
activating one of the one or more far illuminators based upon eye tracking data from a previous frame during the exposure time of the first image sensor; and
activating one of the one or more far illuminators based upon eye tracking data from a previous frame during the exposure time of the second image sensor.

* * * * *